May 26, 1936.  W. HASKEL  2,042,447
QUARRYING TOOL
Original Filed Dec. 1, 1932
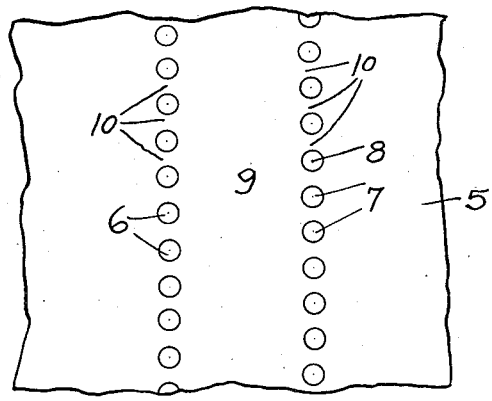
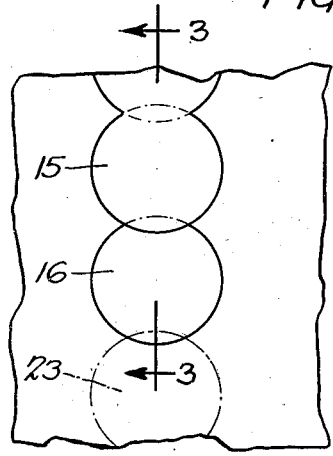
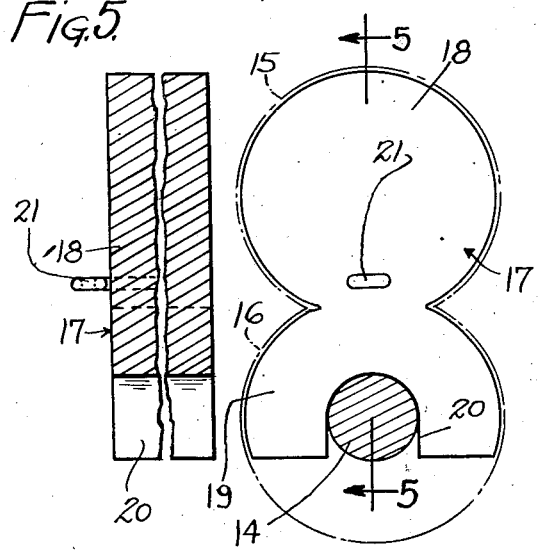
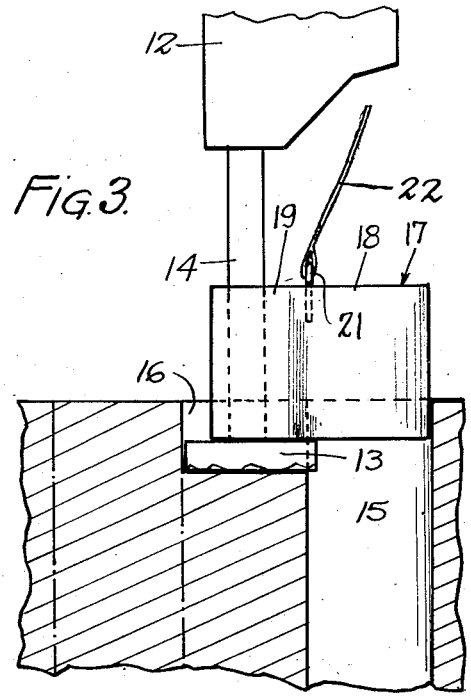
INVENTOR
WILLIAM HASKEL
BY John J. Lynch
ATTORNEY Patented May 26, 1936

2,042,447

UNITED STATES PATENT OFFICE 2,042,447

QUARRYING TOOL

William Haskel, Brooklyn, N. Y.

Application December 1, 1932, Serial No. 645,196
Renewed December 24, 1935

2 Claims. (Cl. 308—4)

This invention relates to a quarrying process and tool employed in the carrying out of the process which eliminates a step in the removal of blocks of material to be quarried.

My invention relates particularly to stone quarrying wherein the present practice in removing a stone section so that removal of other blocks of stone may be initiated is to drill two spaced rows of individually spaced holes or bores and then, as a second step in the operation, to cut the stone between the bores so that a block, which is known as a keystone portion may be removed and thereafter the other sections of material may be cut into the sizes desired and subsequently removed.

The important object of my invention is to do away with the necessity of cutting out the material between these spaced bores and in carrying out my invention, I provide a series of holes or bores, each of which overlap the preceding hole or bore so that when the bores are completed, there is a continuous slot or channel in the material and the boring or drilling operation has eliminated the necessity of cutting out the material between the holes due to the fact that the bores or holes overlap.

A further object of my invention and an equally important one is the provision of a guide tool which is employed in my process which tool makes possible the boring of the holes in their proper relation so that a continuous slot or channel is provided.

Another equally important object of my invention is to provide a tool and a process of removing the keystone or other portions in a quarrying operation which eliminates double work and therefore cuts down materially the cost of the quarrying and the cost of the product.

Changes and variations may be made in the construction shown and described without departing from the principles of the invention or sacrificing the chief advantages; hence such invention is not to be confined to the structures shown in the accompanying drawing, in which, Figure 1 is a diagrammatic illustration of the method in present use for removing a keystone block from material to be quarried.

Figure 2 is a plan view illustrating my improved method of quarrying.

Figure 3 is a section taken on the line 3—3 of Figure 2, and illustrating the operation employed in carrying out my process, the tool employed being shown in outline.

Figure 4 is a plan view of a guide tool employed in my quarrying operation, and

Figure 5 is a section taken on the line 5—5 of Figure 4 showing the construction of the guide tool.

Referring to the drawing in detail, and particularly Figure 1 thereof, 5 indicates a mass of stone or other material to be quarried which in present practice is provided with spaced rows 6 and 7 of bores 8 which are drilled to the desired depth to outline which is known as a keystone or other block 9 which must be removed before blocks can be cut from the material. This keystone portion 9 in present-day method is taken out by removing the material 10 between the bores 6 and the bores 7 so that a slot is provided outlining said keystone portion. This process necessitates first, a boring operation and then cutting the material out between the bores and in order to overcome the second step in this process, I have provided a guide tool which permits drilling overlapping bores in the material so that removal of the material between the bores is taken care of during the drilling operation thus eliminating this second step which has proven costly in quarrying operations.

As a first step in the process of carrying out my invention, I use the ordinary quarrying drill tool 12 which operates the drill 13 in the well known manner, which drill is provided with a drill shank 14. In commencing the cutting operation, I first drill the initial bore 15 and then move the drill 13 in the direction that the material is to be slotted to cut out the keystone portion until the drill 13 overlaps the hole 15, the drill being readily held in this position due to the fact that it is on top of the mass to be drilled and the drilling operation continues until a shallow bore 16 is provided, see Figure 3, and until the drill 13 sinks below the level of the mass sufficiently to bring into use the important feature of my invention, namely, the guide tool 17.

It is quite evident that the boring of a mass of material in a quarrying operation may necessitate deep boring and due to the imperfections in the stone, it is quite evident that the drill 13 would not remain in the bore 16 but would gradually work its way into the bore 15 and in order to prevent this, I have provided, as before mentioned, the tool 17, which consists of a cylindrical portion 18 and a similarly shaped yoke portion 19, both portions being slightly tapered from top to bottom, the portion 18 being of such size that it will fit within the bore 15 without permitting too much play and the yoke 19 will fit within the bore 16 without permitting too much play. This yoke portion 19 is provided with an opening 20, the edges of which fit closely about the shank 14 of the drill. The tool 17 is further provided on its upper surface and at a point where the mass will be balanced, with an eye 21 through the medium of which the tool may be drawn up out of the bore as by a string or wire 32. Due to the weight of the tool 17 and its dimensions, it will follow the drill 13 and engaging, as it does, in its yoke portion, the shank 14 of the drill, will maintain the drill in its proper relation with the opening 15 so that the bores 15 and 16 are complete, and, being in overlapping relation, will provide between them, an open space or slot which completes the channel.

When the bores 15 and 16 have been completed, it is simply necessary to place the drill in position to make the bore 23, as illustrated in Figure 2, in outline, and in this position, the portion 18 of the guide tool 17 is then placed in the bore 16 and so on, until a series of bores are provided longitudinally and in alignment so that the material is cut out and can be removed for further quarrying operations as described.

In view of the fact that in quarrying operations, the drill sizes are decreased in size with approximately every two feet of depth of bore, separate guide tools will be employed for each change of drill size. For instance for the first two feet of drilling, a two inch diameter drill may be used and this of course, would necessitate a two inch guide tool, and the second two feet of drilling would employ a drill of one and seven-eighths inches in diameter and the tool would then be used which had one and seven-eighths inch diameter cylindrical portion 18 and also yoke portion 19.

It is quite evident, therefore, that my process eliminates the necessity of cutting between bores and thus reduces labor and time and the cost of the quarrying operation. Also, I have provided a method of cutting out a keystone or other portion in a quarrying operation which makes use of a guide tool that maintains the drill in fixed relation with a bore already provided.

My invention is not to be restricted to the precise details of construction shown since various changes and modifications may be made therein without departing from the scope of the invention or sacrificing the advantages derived from its use.

What I claim is:—

1. A tool for use in a boring operation, comprising a solid cylinder portion arranged to be positioned in a bored hole, and an integral yoke extension on the cylinder for engaging the shank of a drill used in boring an adjacent overlapping hole, said yoke being open at one side whereby the drill and tool are used together without passing the drill through the tool.

2. A tool for use in a boring operation, comprising a cylinder portion arranged to be positioned in a bored hole, and an integral yoke extension on the cylinder for engaging the shank of a drill used in boring an adjacent overlapping hole, said yoke being open at one side whereby the drill and tool are used together without passing the drill through the tool.

WILLIAM HASKEL.